US008010259B2

(12) United States Patent
Nakazawa et al.

(10) Patent No.: US 8,010,259 B2
(45) Date of Patent: Aug. 30, 2011

(54) CONTROL APPARATUS OF IRRADIATING DIRECTION OF VEHICLE LAMP AND INITIALIZING METHOD THEREOF

(75) Inventors: Yuichi Nakazawa, Shizuoka (JP); Takahisa Nakamura, Shizuoka (JP); Kazuhiro Suzuki, Shizuoka (JP); Kazufumi Morinaga, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 1235 days.

(21) Appl. No.: 11/621,195

(22) Filed: Jan. 9, 2007

(65) Prior Publication Data
US 2007/0168099 A1   Jul. 19, 2007

(30) Foreign Application Priority Data

Jan. 13, 2006   (JP) .................................. 2006-005493

(51) Int. Cl.
   *B60Q 1/10*   (2006.01)
   *F21V 21/28*  (2006.01)
(52) U.S. Cl. ......................................... 701/49; 362/459
(58) Field of Classification Search ............... 701/49, 701/36–38; 362/459, 460, 464–469, 276, 362/802, 272
See application file for complete search history.

(56) References Cited

U.S. PATENT DOCUMENTS

| 6,305,823 | B1* | 10/2001 | Toda et al. | 362/276 |
|---|---|---|---|---|
| 6,430,521 | B1* | 8/2002 | Toda | 702/150 |
| 6,817,741 | B2 | 11/2004 | Toda et al. | |
| 7,057,504 | B2* | 6/2006 | Hayami | 340/458 |
| 7,501,767 | B2* | 3/2009 | Hayami | 315/82 |
| 7,552,001 | B2* | 6/2009 | Ando | 701/49 |
| 7,572,040 | B2* | 8/2009 | Okura et al. | 362/465 |
| 7,649,321 | B2* | 1/2010 | Nakazawa et al. | 315/82 |
| 2006/0039131 | A1* | 2/2006 | Nakazawa et al. | 362/43 |
| 2006/0291222 | A1* | 12/2006 | Ando | 362/466 |

FOREIGN PATENT DOCUMENTS

| JP | 2000-16164 | 1/2000 |
|---|---|---|
| JP | 2003040029 | 2/2003 |
| JP | 2004-196212 | 7/2004 |

* cited by examiner

*Primary Examiner* — Ronnie Mancho
(74) *Attorney, Agent, or Firm* — Fish & Richardson P.C.

(57) ABSTRACT

An irradiating direction control apparatus includes a storing portion for storing a design reference value of a vehicle and storing output voltages of vehicle height sensors when the vehicle is in a reference attitude as measured reference values, an operating portion for operating a reference vehicle height based on the measured reference value and the design reference value and operating a pitch angle of the vehicle based on detected outputs of the vehicle height sensors and the reference vehicle height and the design reference value, and a deflection control portion for controlling to deflect an irradiating direction of a lamp based on the operated pitch angle. Even when the design reference value of the vehicle is stored to the storing portion at a later step of steps of assembling the vehicle, the reference vehicle height can be operated by the output voltages and the design reference value and initialization based on the reference vehicle height can be realized. A degree of freedom of design of a factory layout is promoted and a production efficiency is promoted.

7 Claims, 6 Drawing Sheets

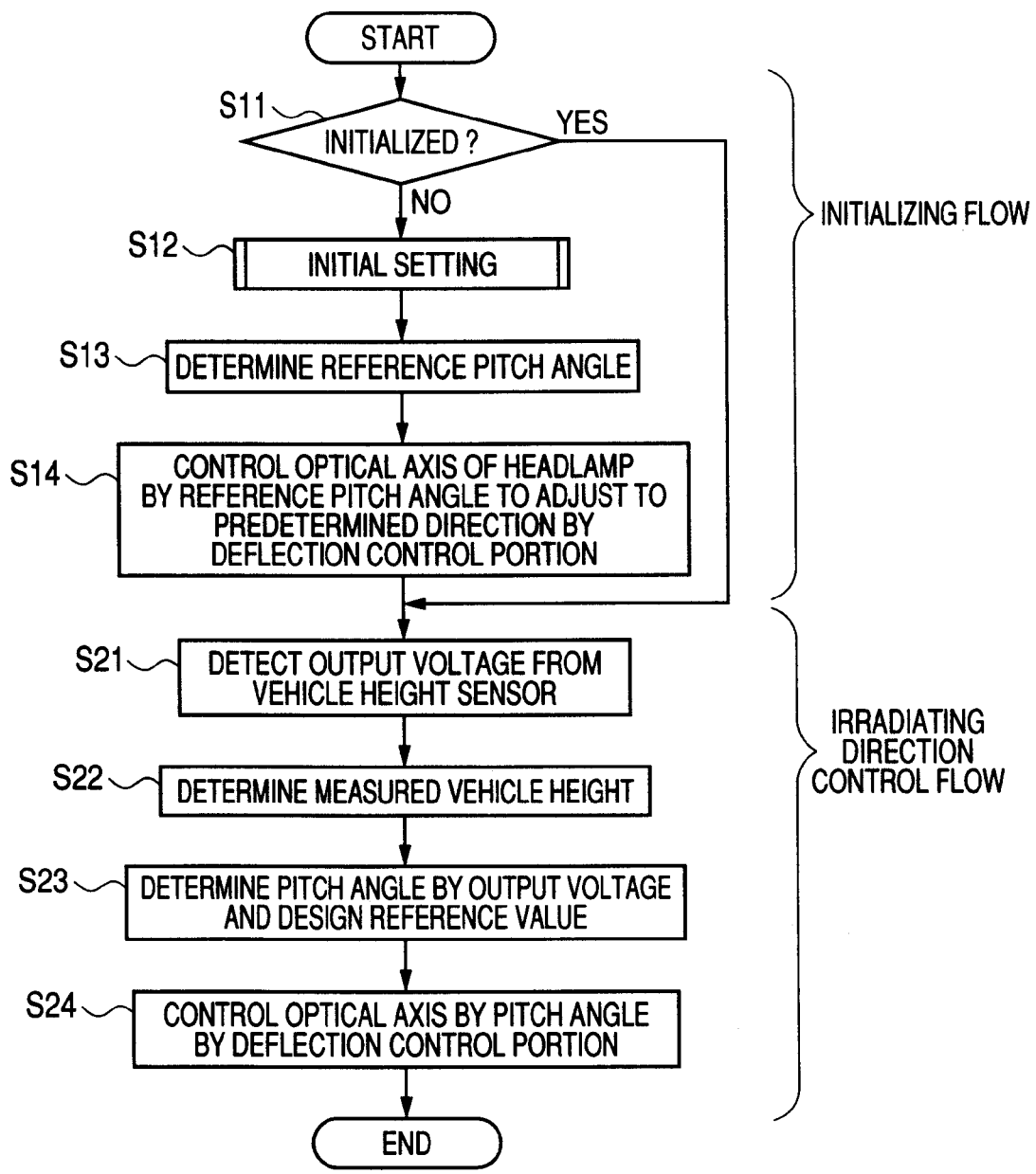

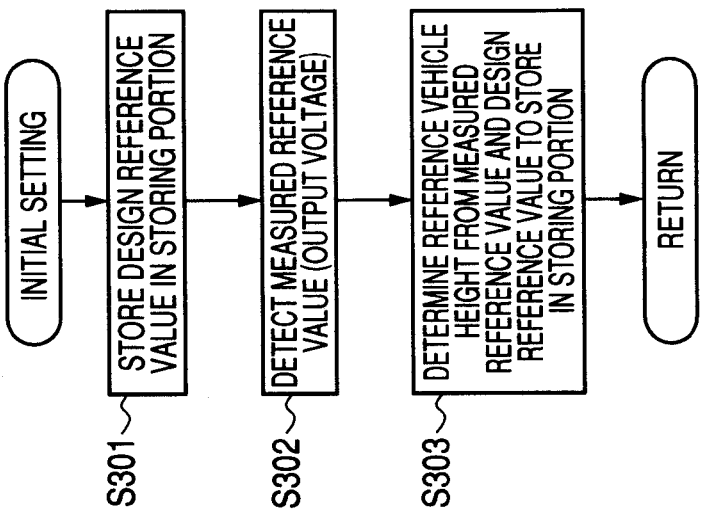
FIG. 4(c) RELATED ART FLOW
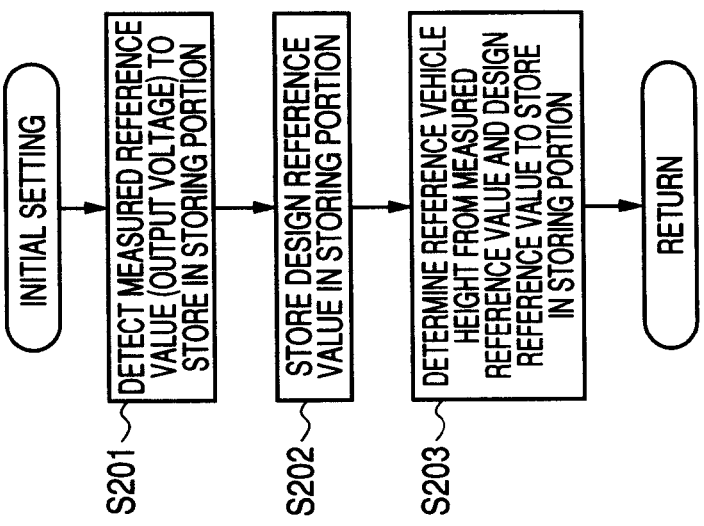
FIG. 4(b) F2: MEASURED REFERENCE VALUE PRECEDING FLOW
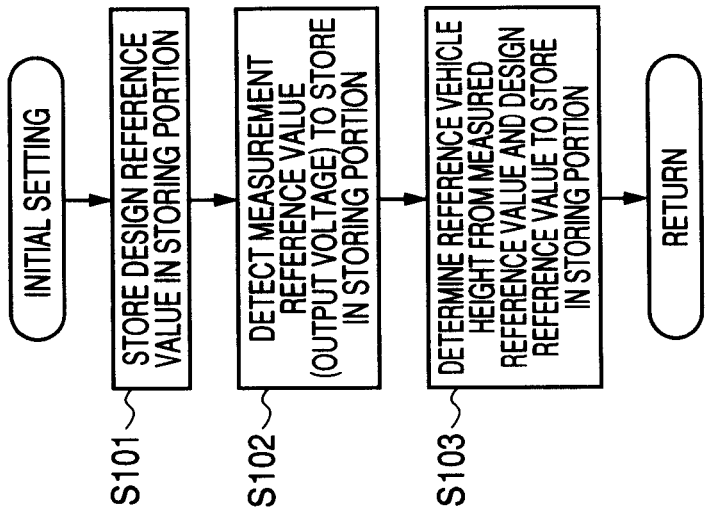
FIG. 4(a) F1: DESIGN REFERENCE VALUE PRECEDING FLOW

CONTROL APPARATUS OF IRRADIATING DIRECTION OF VEHICLE LAMP AND INITIALIZING METHOD THEREOF

This application claims foreign priority from Japanese Patent Application No. 2006-005493, filed on Jan. 13, 2006, the entire contents of which are hereby incorporated by reference.

TECHNICAL FIELD

This disclosure relates to an apparatus for controlling the irradiating direction of a lamp of a vehicle such as an automobile. The irradiating direction can be maintained in a constant direction regardless of a change in a pitch angle (elevation angle) in a front and rear direction of the vehicle. An initializing method of the control apparatus also is disclosed.

BACKGROUND

The optical axis of a vehicle headlamp may be set in a predetermined direction relative to a road surface to achieve a light distribution characteristic to reduce glare for a vehicle traveling in the opposite direction or a foregoing vehicle. An irradiation direction control apparatus has been proposed for deflecting the optical axis up and down such that a direction of the headlamp's optical axis forms a predetermined angle relative to a road surface even when the elevation angle, or pitch angle, is changed as a result of the vehicle's loading or traveling condition. For example, Japanese patent document JP-A-2003-40029 discloses providing vehicle height sensors at front and rear wheel portions of the automobile and calculating the change in pitch angle using an ECU (electronic control unit) based on a vehicle height of the front and rear wheel portions as detected by the vehicle height sensors. The optical axis of a headlamp is controlled based on the calculated pitch angle.

The foregoing type of irradiation direction control apparatus typically needs to be initialized at a factory for manufacturing the automobile (i.e., an assembly factory). FIG. 5(a) is a conceptual view for explaining the initialization operation. The optical axis of the headlamp (HL) is set to a predetermined reference angle $\theta 0$ after bringing the automobile (CAR) to a reference state by setting (stopping) the automobile CAR on a horizontal level block B. At the same time, the heights of vehicle body positions FP, RP at the front and rear wheel portions are detected by vehicle height sensors. The vehicle height of the front wheel portion in the reference state is designated as Hf0 (for example, in units of millimeters (mm)). Similarly, the vehicle height of the rear wheel portion is designated as Hr0 (mm). The vehicle heights are stored in memory within the ECU as reference vehicle heights. A pitch angle $\theta p$ of the automobile is set as "0". When the front or rear portion of the automobile is inclined upwards or downwards as the result of a change in a passenger or a load, a traveling condition or the like, the vehicle height of the front or rear wheel portions is changed. The ECU calculates the pitch angle of the automobile and controls the optical axis angle of the headlamp HL based on the calculated pitch angle. For example, if the vehicle height of the front wheel portion becomes Hfx (mm) and the vehicle height of the rear wheel portion becomes Hrx (mm) as shown by FIG. 5(b), the pitch angle relative to the reference state of the automobile (pitch angle $\theta p=0$) becomes $\theta px$, and the angle of the headlamp's optical axis becomes $\theta HLx$. Hence, the pitch angle $\theta px$ is calculated based on amounts of changes in the front and rear vehicle heights $\Delta Hf(=Hfx-Hf0)$, $\Delta Hr(=Hrx-Hr0)$. The optical axis of the headlamp is controlled to deflect upwards or downwards such that the optical axis angle $\theta HL$ of the headlamp serves as the reference optical axis angle $\theta 0$ even when the pitch angle $\theta px$ is changed. Thus, the irradiating direction can be controlled such that the optical axis of the headlamp HL remains at a constant angle relative to the road surface regardless of a change in the pitch angle.

In initializing the irradiating direction control apparatus described above, the respective vehicle heights of the front and rear wheel portions detected by the vehicle height sensors are stored in memory as the reference vehicle heights. For example, an output voltage (unit: V (volt)) detected by the vehicle height sensor is converted into the vehicle height (unit: mm (millimeter)) by the ECU and is stored in the memory. The structure for attaching the vehicle height sensor differs according to the type of automobile, as shown by FIG. 6. Therefore, a characteristic value in converting the output voltage into the vehicle height differs depending on the automobile type. As a result, even when the output voltage from the vehicle height sensor stays the same, the converted vehicle height value differs. The drawing shows schematically respective characteristics C1, C2, C3, for example, of a C1 type vehicle, a C2 type vehicle, and a C3 type vehicle and shows that vehicle heights h1, h2, h3—based on the same output voltage v1 of the vehicle height sensor—differ.

According to the foregoing initialization technique, if the design reference value is not stored previously, it is not possible to detect the vehicle height. Therefore, in some automobile assembly factories, as shown by a flowchart in FIG. 4(c), it is necessary to store a design reference value to ECU of the automobile (S301), set the automobile on a level block and detect an output of a vehicle height sensor as a detected output (S302), and calculate a vehicle height by calculating a detected output voltage based on the design reference value in ECU and storing the calculated vehicle height as the reference vehicle height (S303). In the foregoing technique, at step S302, it is necessary to install a level block having a space in correspondence with one automobile, a step stage having the space is to be ensured in an assembling factory, and a stage for carrying out step S301 is to be arranged on an upstream side of the level block of a fabricating line. Such requirements constitute a restriction in designing the factory layout and restrict the degree of freedom of design. Further, at the assembly factory, the design reference value for the automobile to be assembled must be stored while moving an apparatus along the fabrication line for carrying out step S301 so as to improve the manufacturing efficiency.

SUMMARY

The present invention relates to an irradiation direction control apparatus of a vehicle lamp that, in some implementations, may provide greater freedom in factory layout design, may promote production efficiency, and provide greater freedom in carrying out the initialization process.

According to one aspect of the invention, an irradiating direction control apparatus of a vehicle lamp includes a lamp which can be controlled to deflect an irradiating direction, a vehicle height detector for detecting a vehicle height of the vehicle, and a controller (e.g., an electronic control unit) for controlling the lamp's deflection based on the vehicle height detected by the vehicle height detector. The controller may include storing means (e.g., memory) for storing a design reference value of the vehicle and storing a detected output of the vehicle height detector as a measured reference value when the vehicle is in a reference position. The controller is adapted for determining a reference vehicle height based on the measured reference value and the design reference value and operating a pitch angle of the vehicle based on the detected output of the vehicle height detector and the reference vehicle height. The controller also is adapted for controlling the irradiating direction of the lamp based on the pitch angle.

The vehicle height detector can include a vehicle height sensor that provides an electric signal to correspond to the vehicle height. The storing means is capable of storing a value of the electric signal, and the controller is capable of calculating the reference vehicle height converting the value of the electric signal into a length indicative of the vehicle height. Further, the design reference value includes a reference value for converting the electric signal for the detected output of the vehicle height detector into the vehicle height.

According to another aspect of the invention, a method includes storing a design reference value of the vehicle, storing a detected output of the vehicle height detector when the vehicle is in a reference position as a measured reference value, and determining the reference vehicle height based on the measured reference value and the design reference value. The order of storing the design reference value and storing the detected output can be reversed.

Some implementations may include one or more of the following advantages. As noted, the irradiating direction control apparatus can include storing means for storing the detected output of the vehicle height detector when the vehicle is in the reference position without converting the detected output into the vehicle height. Therefore, even when the storing means is stored with the design reference value of the vehicle of a different type or kind at a later step, the reference vehicle height can be determined by the detected output and the design reference value, and initialization based on the reference vehicle height can be realized. In carrying out the initialization process, the step of storing the design reference value can be set to an arbitrary order of steps, a layout of an assembly factory for the vehicle can more freely be designed, and the production efficiency can be promoted.

Other features and advantages may be apparent from the following detailed description, the accompanying drawings and the claims.

BRIEF DESCRIPTION OF THE DRAWINGS

FIG. 3 is a flowchart for explaining an initializing process and an irradiating direction control process.

FIGS. 4(a) to 4(c) illustrate flowcharts for explaining initialization settings.

DETAILED DESCRIPTION OF THE EXEMPLARY EMBODIMENTS

Figure 1:
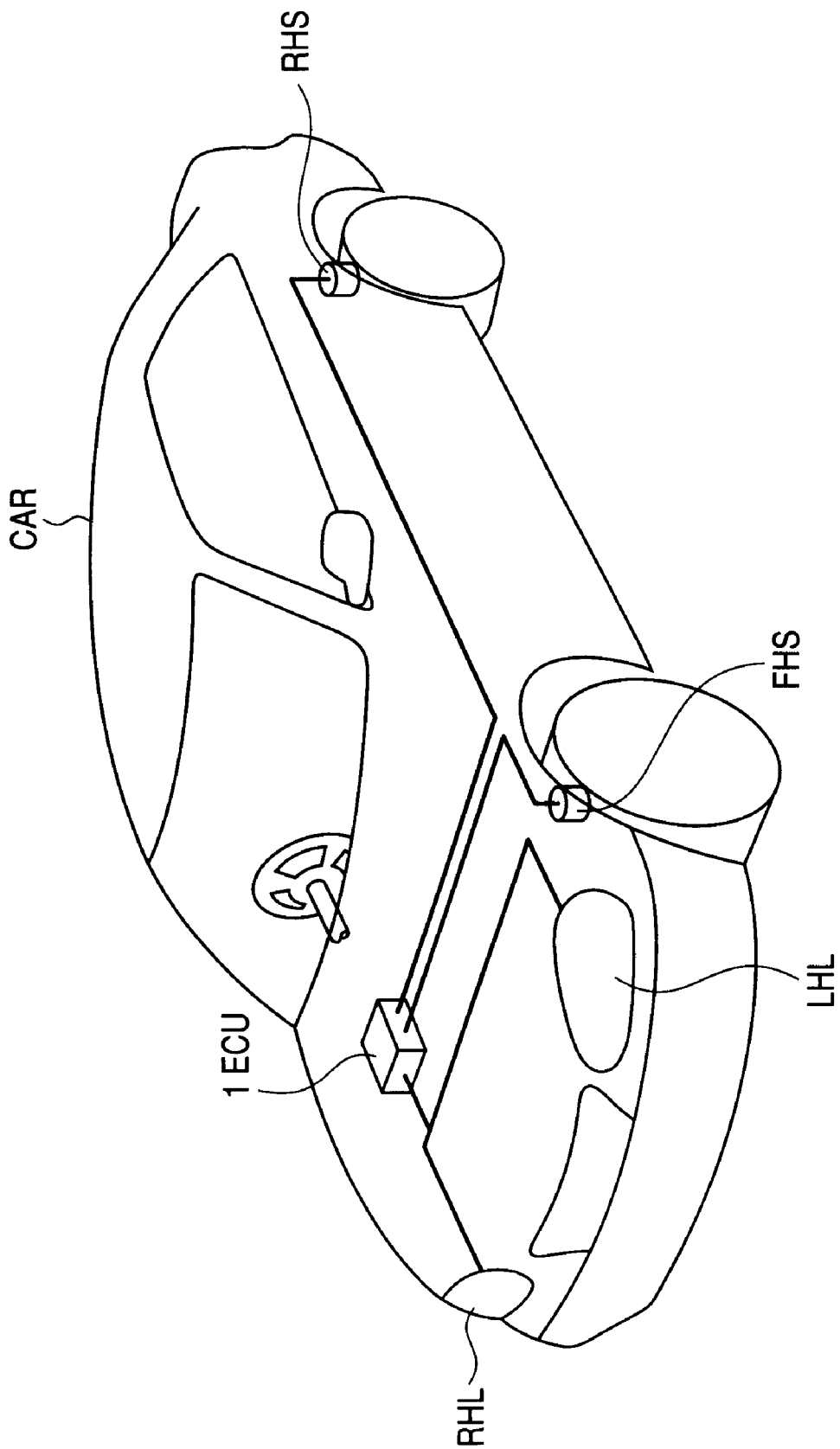
FIG. 1 is a conceptual view of an automobile including an irradiating direction control apparatus.

An example of the invention is explained below in reference to the drawings. FIG. 1 is a conceptual view of an automobile including an irradiating direction control apparatus. A front wheel portion and a rear wheel portion of an automobile (CAR) are respectively arranged with vehicle height sensors FHS, RHS, for detecting vehicle heights of the respective vehicle body positions FP, RP at the front and rear wheel portions (see FIG. 5(a)). For example, the front portion vehicle height sensor FHS includes a potentiometer for detecting a rotational angle of an arm (not illustrated) that pivots in accordance with up and down movement of the front wheel to provide a voltage corresponding to an angle of rotation of the arm. When the arm is pivoted as a result of a change in the vehicle height, the change in the vehicle height is detected as a change in the output voltage of the vehicle height sensor FHS. The same applies to the rear portion vehicle height sensor RHS. The respective vehicle height sensors FHS, RHS are connected to an electronic control unit ECU1 to provide the output voltages detected by the respective vehicle height sensors FHS, RHS to ECU1. Headlamps RHL, LHL are respectively arranged on left and right sides of the front portion of the automobile, and irradiation optical axes of the left and right headlamps RHL, LHL are controlled to deflect in an up and down direction by the electronic control unit ECU1.

Figure 2:
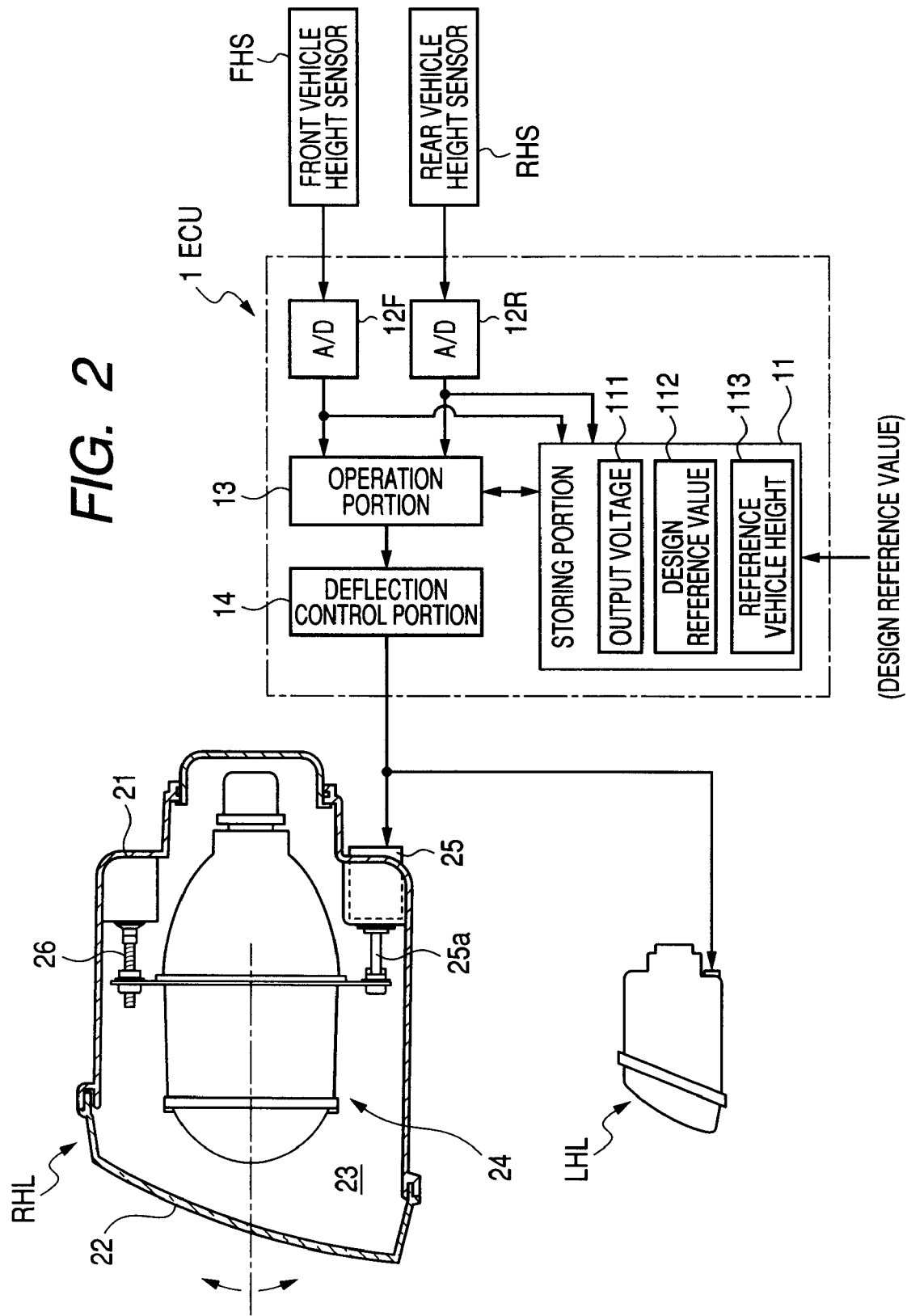
FIG. 2 is a block diagram of the irradiating direction control apparatus.

FIG. 2 is a block constitution diagram of the irradiating direction control apparatus shown in FIG. 1. As shown by the outline structure of the right headlamp in FIG. 2, a projector type lamp 24 is mounted in a lamp chamber 23 composed of a lamp body 21, and a transparent cover 22 attached to a front face opening of the lamp body 21. The projector type lamp 24 has a leveling actuator 25 by which the projector type lamp 24 can be controlled so as to incline in the up and down direction. The projector type lamp 24 is axially supported to be able to incline in the up and down direction using a fulcrum by an aiming adjusting mechanism 26 on an upper side. As the leveling actuator 25, a linear actuator for moving forward and rearward an output rod 25a in a length direction is arranged inside the lamp body 21, and a front end of the output rod 25a is connected to a lower portion of the projector type lamp 24. By driving the leveling actuator 25 to move the output rod 25a forward and rearward, the projector type lamp 24 can be inclined in the up and down direction centering on the fulcrum to adjust the optical axis in a vertical direction. The same applies to the left side lamp LHL.

Figure 6:
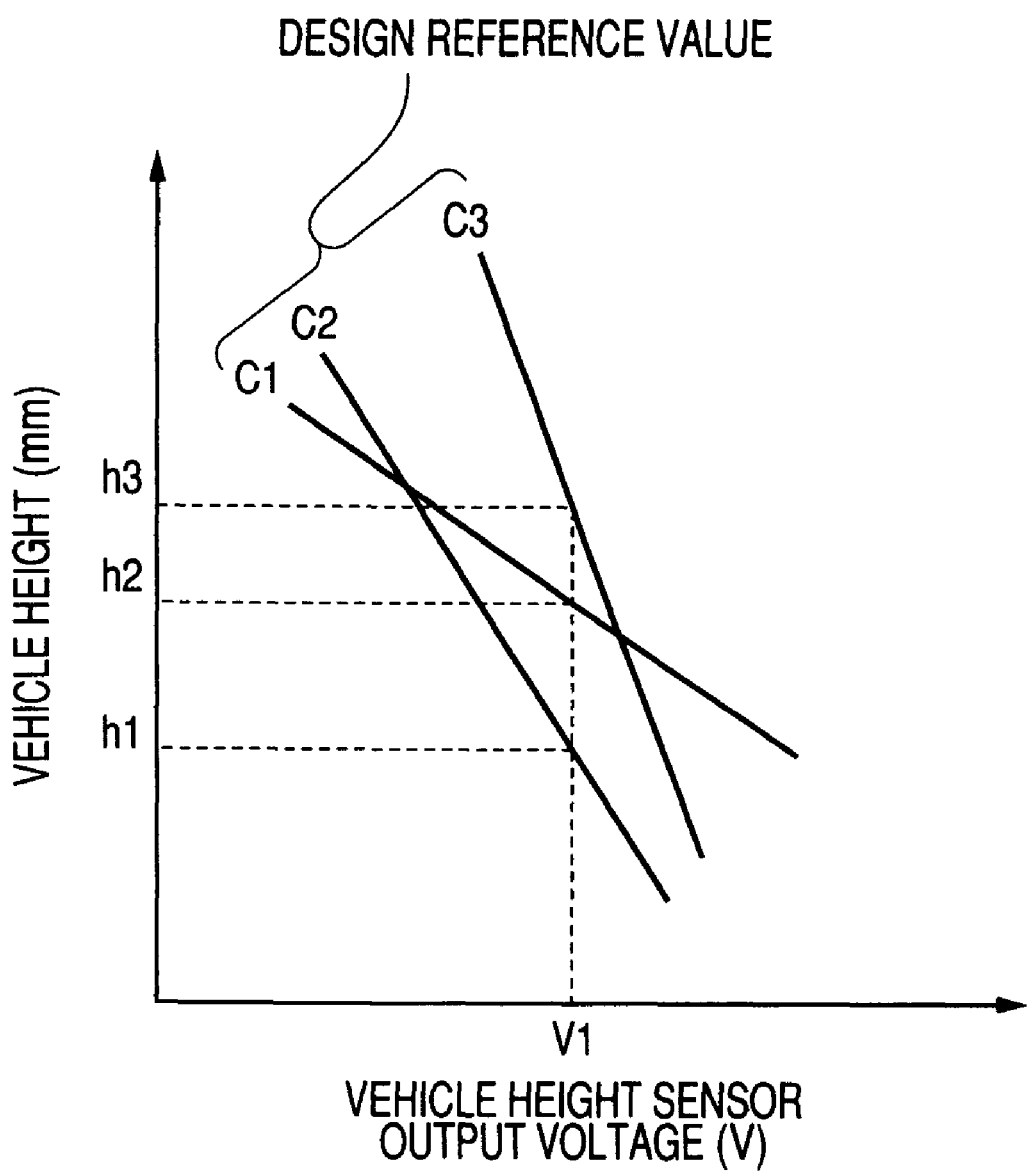
FIG. 6 is a diagram showing a correlation between a detected output of a vehicle height sensor and a vehicle height.

The electronic control unit ECU1 includes a storing position 11 for storing various data including a design reference value, analog-to-digital (A/D) conversion portions 12F, 12R for converting the output voltages from the respective vehicle height sensors FHS, RHS into digital values, and an operating portion 13. The operating portion 13 is for carrying out a predetermined operation based on the digital values converted by the A/D converting portions 12F, 12R and various data stored to the storing position 11 and the like. A deflection control portion 14 is for controlling deflection of the optical axes of the optical headlamps RHL, LHL by controlling the leveling apparatus of the headlamps RHL, LHL, (i.e., the leveling actuator 25) based on a pitch angle operated by the operating portion 13. In this case, the storing portion 11 has an output voltage storing region 111 for storing the digital values obtained by converting the output voltages from the respective front and rear vehicle height sensors FHS, RHS by the A/D conversion portions 12F, 12R in a reference state of the automobile. A design reference value storing region 112 is for storing a design reference value inherent to a type, a kind or the like of the automobile mounted with the electronic control unit ECU1, particularly, the characteristics of C1, C2, C3 or the like for converting the output voltage of the vehicle height sensor into the vehicle height shown in FIG. 6, or a wheel base length (i.e., a length the same as an interval of the respective front and rear vehicle height sensors FHS, RHS). A reference vehicle height storing region 113 is for storing a reference vehicle height based on the measured reference value and the design reference value in operation values operated by the operating portion 13.

The operating portion 13 operates the vehicle height based on the digital value of the output voltage stored to the output voltage storing region 111 of the storing portion 11 (i.e., the measured reference values, and the design reference value stored to the design reference value storing region 112 of the storing portion 111) and stores the operated vehicle height to the reference vehicle height storing region 113 as the reference vehicle height. Further, the operating portion 13c converts the output voltages (i.e., that are successively detected by the respective vehicle height sensors FHS, RHS in accordance with operating the automobile and converted into the digital values by the A/D conversion portions 12F, 12R) into the vehicle heights based on the design reference value to provide the measured vehicle heights. The operating portion 13 operates the pitch angle of the automobile based on the measured vehicle heights, the reference vehicle height and the wheel base length or the like. The deflection control portion 14 can control deflection of the optical axes of the respective headlamps RHL, LHL to be directed in a predetermined direction by controlling the leveling apparatus of the respective headlamps RHL, LHL based on a pitch change angle operated by the operating portion 13 such that change angles of the optical axes in accordance with the pitch change angle become "0".

Next, an explanation will be given of an initializing step in the irradiating direction control apparatus having the foregoing arrangement. FIG. 3 is a flowchart for explaining an initializing flow and an irradiating direction control flow of the irradiating direction control apparatus of the automobile assembled at an assembly factory. First, at step S11, it is determined whether initialization of the irradiating direction control apparatus has already been finished for the automobile assembled at the automobile assembly factory. If the initialization has not been finished, initial setting (S12) is carried out. In the initial setting (S12), the initialization is carried out by either of the following two flows.

"F1: Design Reference Value Preceding Setting Flow"

Figure 5A:
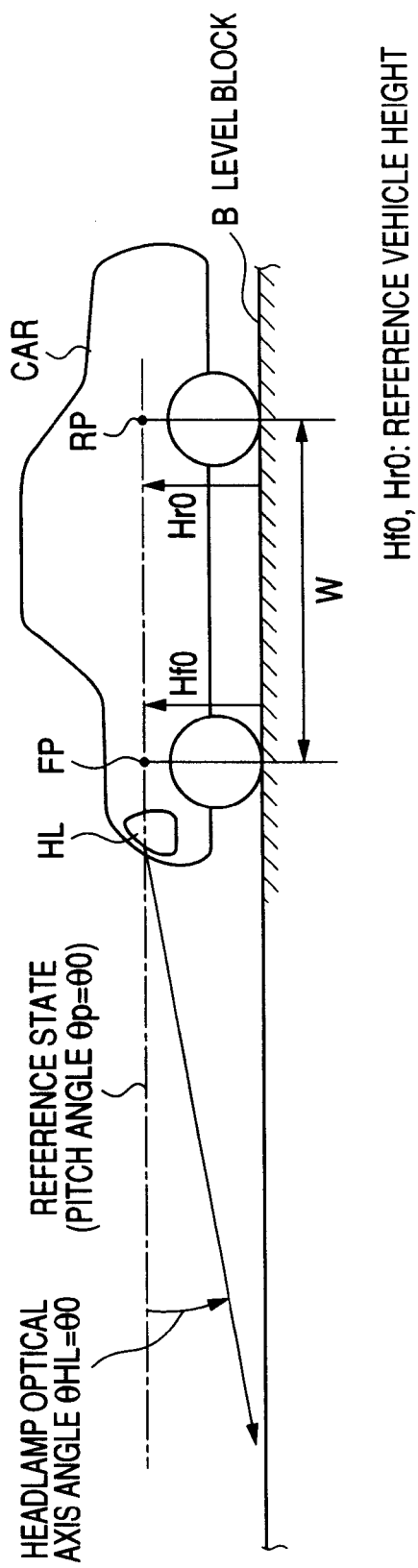
FIGS. 5(a) and 5(b) illustrate conceptual views for explaining an operation of an irradiating direction control.

FIG. 4(a) is a flow chart of "design reference value preceding setting flow". First, a design reference value is stored in the storing portion 11 for the assembled automobile (S101). The design reference value includes the correlative characteristic between the output voltages of the vehicle height sensors FHS, RHS and the vehicle height shown in FIG. 6 in data inherent to the type or the kind of the automobile and is stored in the design reference storing portion 112 of the storing portion 11. Next, as shown by FIG. 5(a), the automobile (CAR) is set above the level block B to establish a position in a reference state, the output voltages from the respective vehicle height sensors FHS, RHS are converted into the digital values in the A/D conversion portions 12F, 12R, and the converted digital values are stored in the output voltage storing region 111 of the storing portion 11 as the measured reference values (S102). Next, the operating portion 13 determines the measured reference values stored in the output voltage storing region 111 in reference to the design reference value stored in the design reference storing region 112, determines the respective vehicle heights, and stores the vehicle heights in the vehicle height storing region 113 as the reference vehicle heights Hf0, Hr0 (S103).

"F2: Measured Reference Value Preceding Setting Flow"

FIG. 4(b) is a flowchart of "measured reference value preceding setting flow" in which the design reference value is set at a later step. That is, first, the assembled automobile (CAR) is set on the level block B to establish a position in the reference state, the output voltages from the respective vehicle height sensors FHS, RHS are converted into the digital values by the A/D conversion portions 12F, 12R, and the converted digital values are stored in the output voltage storing region 111 of the storing portion 11 as the measured reference value (S201). Next, the design reference value of the automobile is stored in the storing portion 11 (S202). The design reference value is data inherent to the type or the kind of the automobile similar to the "F1: design reference value preceding setting flow", and includes the correlative characteristic between the output voltages of the vehicle height sensors FHS, RHS and the vehicle height shown in FIG. 6 and is stored in the design reference storing region 112 of the storing portion 11. The operating portion 13 determines the measured reference value stored to the output voltage storing region 111 in reference to the design reference value of the design reference storing region 112, determines the respective vehicle heights and stores the vehicle heights to the vehicle height storing region as the reference vehicle heights Hf0, Hr0 (S203).

In the foregoing two initializing setting flows, steps S101 and S202 are for storing the design reference value to the electronic control unit ECU1 of the automobile by an operator in the assembly factory of the automobile and serve as first steps. Steps S102 and 201 are for detecting the vehicle height by the output voltage of the vehicle height sensor when the automobile is set on the level block to serve as second steps. Steps S103 and S203 are for storing the reference vehicle height determined by automatic processing in the electronic control unit ECU1 and serve as third steps. Further, the "F1: design reference value preceding setting flow" is a flow of carrying out the first, the second, and the third steps in this order; the "F2: measured reference value preceding setting flow" is a flow of carrying out the second, the first, and the third steps in this order.

After carrying out the initializing setting by either of the flows F1 or F2, as shown by FIG. 3, the operating portion 13 operates the pitch of the automobile in reference to the reference vehicle height stored in the reference vehicle height storing region 113 of the storing region 11 and the wheel base length stored in the design reference value storing region 112 of the storing portion 11 to establish the reference pitch angle θp, and makes the pitch angle θp=0 (S13). Further, the deflection control portion 14 controls deflection based on the pitch angle θp such that the optical axes of the headlamps RHL, LHL are directed in the predetermined direction (S14). According to the deflection control, an aiming apparatus (not shown in the drawing) attached to the level block B can be utilized.

Figure 5B:
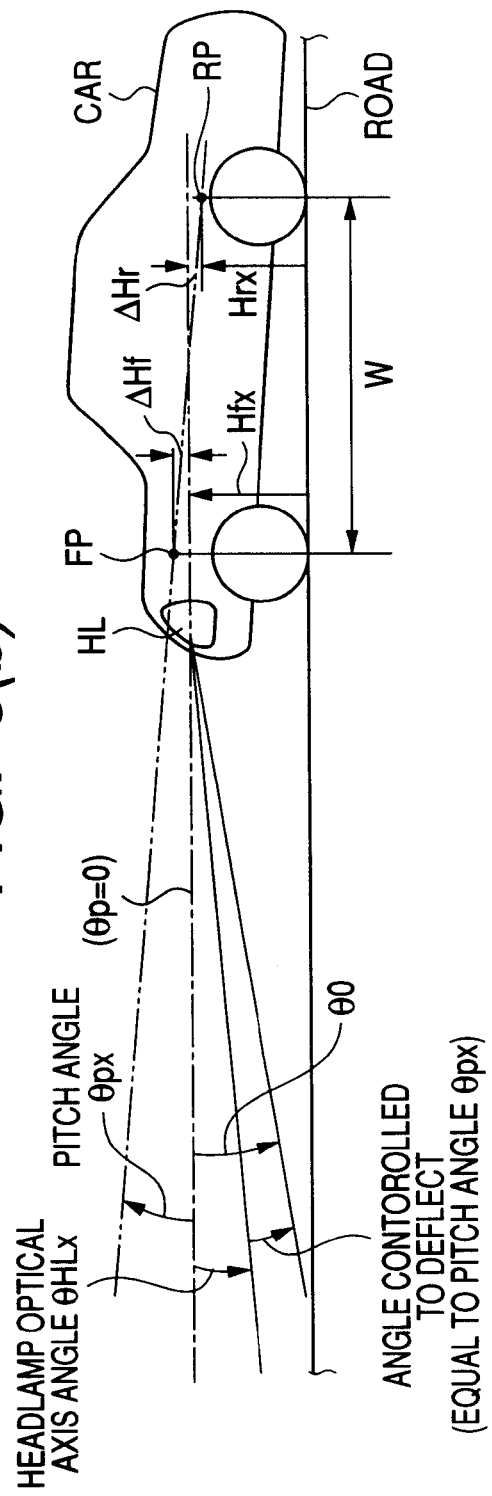

Initialization of the irradiating direction control apparatus is finished as described above. Thereafter, operation can proceed to an irradiating direction control flow for controlling the optical axis of the headlamp to a predetermined angle by following a change in position of the automobile. Further, the same applies to the case in which the initialization is completed at step S11. As shown by FIG. 5(b), when the pitch angle of the automobile is changed in accordance with a change in a passenger, a load, an operating state of the automobile, the vehicle height of at least one of the front wheel portion or the rear wheel portion is changed in accordance therewith. The output voltages from the vehicle height sensors FHS, RHS over time are converted into the digital values by the A/D conversion portions 12F, 12R to be detected (S21). The operating portion 13 converts the output voltages into the vehicle heights based on the design reference value stored in the design reference value storing region 112 of the storing portion 11 to serve as the measured vehicle heights Hfx, Hrx (S22). Next, the operating portion 13 determines the amounts of the changes in the respective front and rear vehicle heights ΔHf (=Hfx−Hf0) and μHr (=Hrx−Hr0) from the measured vehicle heights Hfx, Hrx, and the reference vehicle heights Hf0, Hr0 stored in the reference vehicle height storing portion 113 of the storing portion 11. and the operating portion 13 also calculates the pitch angle θpx [tan θpx=(ΔHf−ΔHr)] based on the amounts of the changes in the vehicle heights and the wheel base length W as another data of the design reference value stored in the design reference value storing region 112 of the storing portion 11 (S23). Then, the deflection control portion 14 controls deflection of the optical axis angles θHLx of the headlamps RHL, LHL in the up and down direction to be the reference optical axis angle θ0 by controlling the leveling apparatus (leveling actuators) 25 of the headlamps RHL, LHL based on the pitch angle θpx (S24). The optical axes of the headlamps RHL, LHL are controlled by a feedback control by an angle corresponding to the calculated pitch angle θpx. Thereby, the optical axis angles θHLx of the headlamps RHL, LHL can be controlled to deflect at a constant angle θ0 relative to the road face regardless of the change in the position of the automobile.

As described above, in initializing the irradiating direction control apparatus shown in FIG. 3, particularly in setting initialization thereof, as shown by FIG. 4(a), the vehicle height is calculated by storing the design reference value in the storing portion 11 and is based on the output voltages of the vehicle height sensor FHS, RHS provided thereafter. The storing portion 11 can be stored directly with the output voltages of the vehicle height sensors FHS, RHS (i.e., the digital values of the output voltages and therefore, as shown by FIG. 4(b)). Even when the output voltages of the vehicle height sensors FHS, RHS are previously stored in the storing portion 11 and the design reference value is stored in the storing portion 11, the electronic control unit ECU1 can determine the reference vehicle height value from the output voltage already stored with respect to the design reference value. Therefore, when laying out fabricating stages for carrying out steps S101, S102, S103 or steps S201, S202, S203 in the assembly factory of the automobile, by changing the order of steps S101 and S102 or the order of steps S201 and S202, the respective stages for carrying out the steps can be aligned according to an arbitrary order along the flow of the fabricating line. Therefore, restrictions on the design and layout of the factory can be alleviated, and greater degrees of freedom of design can be promoted. Further, even in an assembly factory in which it is difficult to align the stages of steps S101 S102 in this order, storing the design reference value for the automobile while moving the apparatus for carrying out step S101 is not needed, and the efficiency of producing the automobile can be promoted.

Although, according to the foregoing implementation, the reference vehicle height is stored in the reference vehicle height storing region 113 at the storing portion 11, the vehicle height is determined by using the output voltages of the vehicle height sensors FHS, RHS and the design reference value at the operating portion 13, and the pitch angle is determined from the vehicle height and the stored reference vehicle height, a difference between the output voltages may be calculated in advance, and the pitch angle may be calculated from the difference. That is, a voltage difference between the output voltages (digital values) of the vehicle height sensors FHS, RHS in the reference state of the automobile and the output voltages (digital values) of the respective vehicle height sensors FHS, RHS during operation of the automobile may determined in advance, the amount of the change in the vehicle height may be calculated from the operated voltage difference, and the pitch angle may be calculated from the amount of the change in the vehicle height. Further, the operation of the reference vehicle height or the operation of the amount of the change in the vehicle height can be determined at any time based on the output voltages of the vehicle height sensors FHS, RHS that serve as the measured reference values and the design reference value. Therefore, it may not be necessary to store the reference vehicle height in the reference vehicle height storing region 113 at the storing portion 11.

Although according to the implementation described in detail above the headlamp is controlled to deflect by arranging the vehicle height sensors at the front and rear wheel portions of the automobile and calculating the vehicle heights of the respective portions based on the detected outputs of the two vehicle height sensors, the invention also is applicable to an irradiating direction control apparatus for arranging the vehicle height sensor to only one of the front or rear wheel portions and controlling deflection of the headlamp by the detected output (output voltage) of the one vehicle height sensor.

Further, although according to the implementation describe in detail above the invention is applied to the irradiating direction control apparatus with a dynamic automatic leveling apparatus for controlling deflection of the headlamp in accordance with a variation in the pitch angle during operation of the automobile, the invention also is applicable to a static automatic leveling apparatus for controlling deflection of the headlamp when the automobile is brought into a stationary state.

Further, although according to the implementation described in detail above the voltage is changed in accordance with the change in the vehicle height as detected by the vehicle height sensor, in some implementations, a current value or a digital value closely related to the vehicle height is provided. That can be employed as long as the vehicle height sensor is of a type in which the detected output follows the change in the vehicle height and the vehicle height is determined based on the detected output regardless of a difference in the type or kind of the vehicle.

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

What is claimed is:

1. An irradiating direction control apparatus for a vehicle lamp capable of controlling deflection of an irradiating direction, the apparatus comprising:
   a vehicle height detector for detecting a vehicle height of a vehicle;
   a controller for controlling deflection of the lamp based on the vehicle height detected by the vehicle height detector; and
   a storing portion including an output electric value storing region and a design reference value storing region,
   wherein the controller is adapted to store a design reference value of the vehicle in the design reference value storing region and to store a detected electric value output by the vehicle height detector when the vehicle is in a reference position in the output electric value storing region as a measured reference value, the controller being further adapted to determine a reference vehicle height based on the measured reference value and the design reference value and to determine a pitch angle of the vehicle based on the detected output of the vehicle height detector and the reference vehicle height, and to control deflection of the irradiating direction of the lamp based on the pitch angle.

2. The irradiating direction control apparatus according to claim 1, wherein the controller is adapted to calculate the reference vehicle height by converting the value of the electric signal into a length corresponding to the vehicle height.

3. The irradiating direction control apparatus according to claim 2, wherein the design reference value includes a reference value for converting the electric value of the vehicle height detector into the vehicle height.

4. An initializing method for an irradiating direction control apparatus of a vehicle lamp capable of controlling deflection of an irradiating direction, the method comprising:

storing a design reference value of the vehicle, storing, as a measured reference value, an output electric value from a vehicle height detector when the vehicle is in a reference position, and determining a reference vehicle height based on the measured reference value and the design reference value.

5. The initializing method according to claim 4, wherein storing the design reference value of the vehicle is carried out after storing the measured reference value, and wherein determining the reference vehicle height is carried out thereafter.

6. The irradiating direction control apparatus according to claim 1, wherein the electric value is a voltage.

7. The initializing method according to claim 4, wherein the electric value is a voltage.

* * * * *